United States Patent
Kanbayashi

(10) Patent No.: US 9,749,482 B2
(45) Date of Patent: Aug. 29, 2017

(54) IMAGE FORMING SYSTEM ADJUSTING SETTING OF IMAGE FORMING APPARATUS TO SETTING OF MOBILE TERMINAL

(71) Applicant: KYOCERA Document Solutions Inc., Osaka (JP)

(72) Inventor: Ryo Kanbayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/163,773

(22) Filed: May 25, 2016

(65) Prior Publication Data
US 2016/0352936 A1 Dec. 1, 2016

(30) Foreign Application Priority Data
May 29, 2015 (JP) .................. 2015-109595

(51) Int. Cl.
*H04N 1/00* (2006.01)
*H04N 1/393* (2006.01)
*G06F 3/01* (2006.01)
*G06F 3/12* (2006.01)
*G06F 17/28* (2006.01)

(52) U.S. Cl.
CPC ......... *H04N 1/00344* (2013.01); *G06F 3/016* (2013.01); *G06F 3/1204* (2013.01); *G06F 3/1254* (2013.01); *G06F 3/1256* (2013.01); *G06F 3/1258* (2013.01); *G06F 3/1292* (2013.01); *G06F 17/289* (2013.01); *H04N 1/0044* (2013.01); *H04N 1/00307* (2013.01); *H04N 1/00411* (2013.01); *H04N 1/393* (2013.01); *G06K 2209/01* (2013.01); *H04N 2201/0055* (2013.01); *H04N 2201/0094* (2013.01)

(58) Field of Classification Search
CPC ...................... H04N 1/00344; H04N 1/00307
USPC ................................. 358/1.15, 1.14
See application file for complete search history.

(56) References Cited

U.S. PATENT DOCUMENTS

| 8,799,417 B2* | 8/2014 | Pearce .............. H04M 3/42178 370/254 |
| 2012/0002226 A1* | 1/2012 | Zhan ..................... G06F 3/1205 358/1.11 |
| 2012/0147420 A1* | 6/2012 | Nishimi ................ G06F 3/1204 358/1.15 |

(Continued)

FOREIGN PATENT DOCUMENTS

JP H10-151840 A 6/1998

*Primary Examiner* — Jacky X Zheng
(74) *Attorney, Agent, or Firm* — Studebaker & Brackett PC

(57) ABSTRACT

An image forming system includes a mobile terminal and an image forming apparatus capable of wirelessly communicating with each other. The mobile terminal stores therein setting information. The mobile terminal includes a first processor. The first processor performs a process of transmitting the setting information to the image forming apparatus. The image forming apparatus includes a second processor and a printing device. The second processor performs an image process on an image according to the setting information transmitted from the mobile terminal. The printing device forms the image processed by the image process on a recording medium.

20 Claims, 13 Drawing Sheets

(56) References Cited

U.S. PATENT DOCUMENTS

2014/0218372 A1\* 8/2014 Missig .................... G06F 3/044
                                                      345/473
2015/0350478 A1\* 12/2015 Hibino ............... H04N 1/00904
                                                      358/1.13

\* cited by examiner

IMAGE FORMING SYSTEM ADJUSTING SETTING OF IMAGE FORMING APPARATUS TO SETTING OF MOBILE TERMINAL

INCORPORATION BY REFERENCE

The present application claims priority under 35 U.S.C. §119 to Japanese Patent Application No. 2015-109595, filed May 29, 2015. The contents of this application are incorporated herein by reference in their entirety.

BACKGROUND

The present disclosure relates to image forming systems.

Image forming apparatuses such as a copier and a multifunction peripheral are typically provided with an operation panel which can be operated by the user. The user can make settings by operating the operation panel. In order to reduce or remove time and effort required for the user's operation, systems which automatically make settings for the individual user have been developed.

For example, an image forming apparatus that automatically sets a language for display has been developed. Specifically, a typical mobile information apparatus is provided with a display device such as a liquid crystal display device, and stores language setting information indicating a language for display. The image forming apparatus acquires the language setting information from the mobile information apparatus held by the user, and displays an operation screen in the same language as the language for display in the mobile information apparatus.

SUMMARY

An image forming system according to the present disclosure includes a mobile terminal and an image forming apparatus. The mobile terminal and the image forming apparatus are capable of wirelessly communicating with each other. The mobile terminal stores therein setting information. The mobile terminal includes a first processor. The first processor performs a process of transmitting the setting information to the image forming apparatus. The image forming apparatus includes a second processor and a printing device. The second processor performs an image process on an image according to the setting information transmitted from the mobile terminal. The printing device forms the image processed by the image process on a recording medium.

DETAILED DESCRIPTION

Embodiments of the present disclosure will now be described with reference to the accompanying drawings. Note that the present disclosure is not limited to the embodiment described below. The same or corresponding parts are designated by the same reference signs throughout the several views, and will not be redundantly described.

First Embodiment

Figure 1:
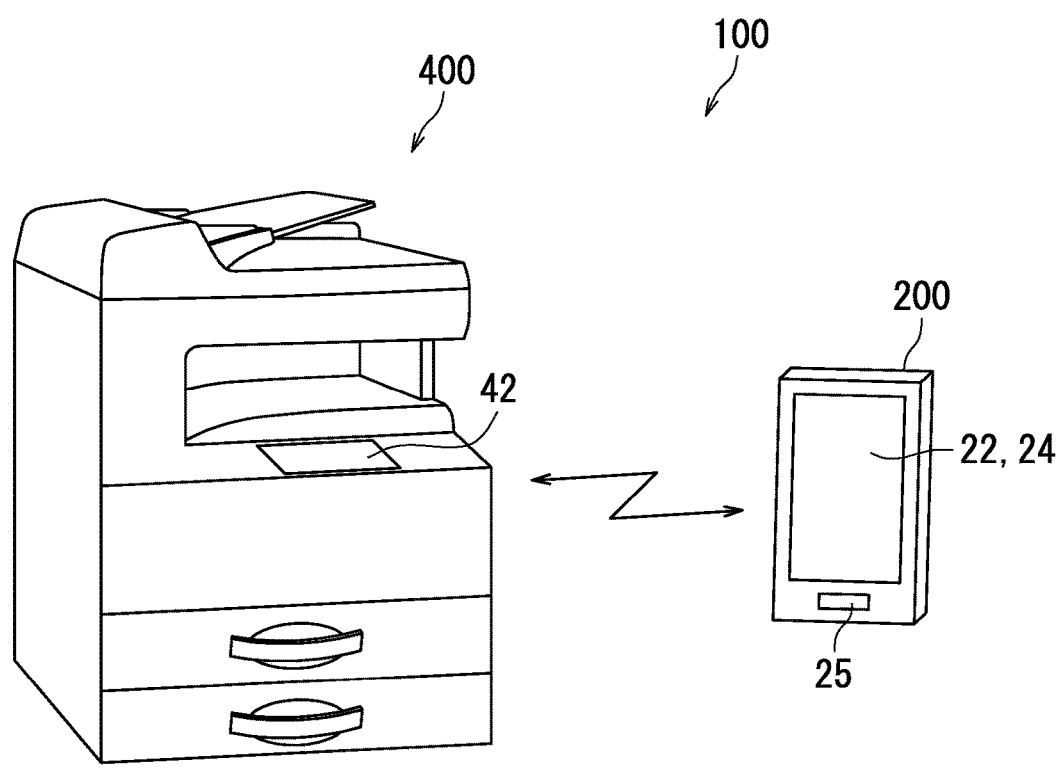
FIG. 1 is a diagram showing an image forming system according to first to eighth embodiments.

FIG. 1 is a diagram showing an image forming system according to this embodiment. As shown in FIG. 1, the image forming system 100 includes a mobile terminal 200 and an image forming apparatus 400. The mobile terminal 200 may, for example, be a mobile telephone, smartphone (multifunctional mobile telephone), tablet computer, or notebook computer. In this embodiment, the image forming apparatus 400 is a multifunction peripheral.

In the image forming system 100, the mobile terminal 200 and the image forming apparatus 400 can wirelessly communicate with each other. The mobile terminal 200 transmits setting information of the mobile terminal 200 to the image forming apparatus 400.

The wireless communication scheme is preferably a short-range wireless communication scheme. When a short-range wireless communication scheme is employed, the possibility that useless communication is performed between the mobile terminal 200 which is held by the user who does not intend to use the image forming apparatus 400, and the image forming apparatus 400, can be reduced.

Figure 2:
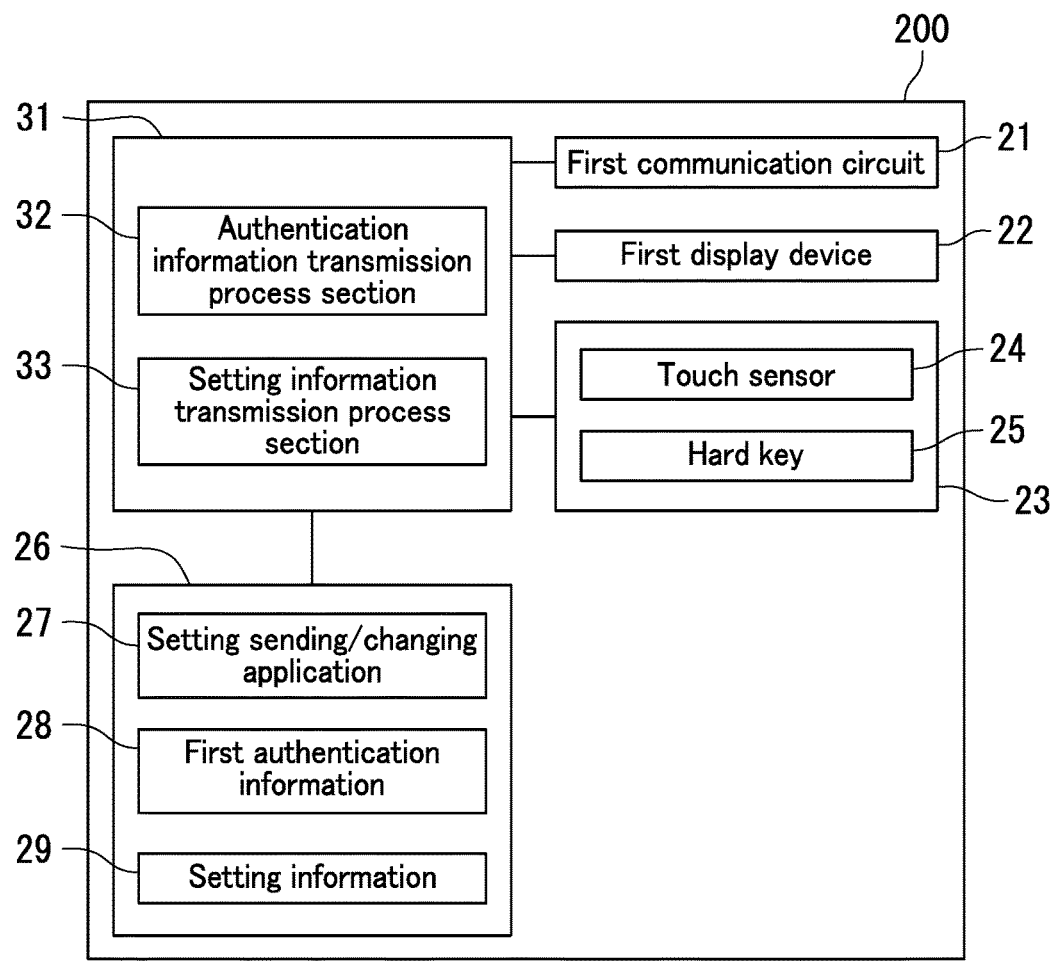
FIG. 2 is a block diagram of a mobile terminal according to the first to seventh embodiments.

FIG. 2 is a block diagram of the mobile terminal 200. As shown in FIG. 2, the mobile terminal 200 includes a first communication circuit 21, a first display device 22, an operation unit 23, a first storage unit 26, and a first processor 31.

The first communication circuit 21 is a wireless communication interface for a short-range wireless communication scheme. The mobile terminal 200 can communicate with electronic apparatuses including a wireless communication interface for the same communication scheme. In this embodiment, the first communication circuit 21 is a non-contact integrated circuit (IC) module. The non-contact IC module may include an IC chip and a radio communication antenna (coil of antenna). When the user holds the mobile terminal 200 over a portion of the image forming apparatus 400 of FIG. 1 where a non-contact IC module is placed, the mobile terminal 200 can communicate with the image forming apparatus 400.

The first display device 22 displays various screens that are images including various items of information. The first display device 22 is, for example, a liquid crystal display device or an organic electroluminescence (EL) display device. The first display device 22 includes a drive device for driving the display surface. The operation unit 23 receives the user's operations. In this embodiment, the operation unit 23 includes a touch sensor 24 and a hard key 25. The touch sensor 24 is disposed on the display surface of the first display device 22. In other words, the mobile terminal 200 includes a touchscreen. By the user operating various buttons displayed on the touchscreen, various items of information (data) are input to the first processor 31. Similarly, by the user operating the hard key 25, various items of information (data) are input to the first processor 31. The first processor 31 causes the mobile terminal 200 to perform various operations according to information (data) input from the operation unit 23. Note that when the mobile terminal 200 includes a touchscreen, the hard key 25 may be removed. When the mobile terminal 200 includes the hard key 25, the touch sensor 24 may be removed.

The first storage unit 26 stores a program, setting information, and the like. The first storage unit 26 typically includes a main storage device and an auxiliary storage device. The auxiliary storage device may include, for example, a hard disk drive (HDD). The main storage device may include a random access memory (RAM) and a read only memory (ROM).

In this embodiment, the first storage unit 26 stores a setting sending/changing application 27, first authentication information 28, and setting information 29. The setting sending/changing application 27 is a program for transmitting the setting information 29 to the image forming apparatus 400 shown in FIG. 1. The first authentication information 28 is account information which is used during logging in (user authentication) to the image forming apparatus 400. The first authentication information 28 contains, for example, one of the user's name, an ID, and a password, or a combination of two or more thereof. The setting information 29 contains various settings for the mobile terminal 200. For example, the setting information 29 may contain language setting information, font setting information, and character size setting information. The language setting information indicates a language for display. The font setting information indicates a font of a character displayed on the first display device 22. The character size setting information indicates the size of characters which are displayed on the first display device 22.

The first processor 31 executes a program stored in the first storage unit 26 to perform various processes such as numerical calculation, information processing, and apparatus control, and thereby controls operations of the mobile terminal 200. The first processor 31 may include, for example, a central processing unit (CPU) or a micro-processing unit (MPU).

In this embodiment, the first processor 31 executes the setting sending/changing application 27 to function as an authentication information transmission process section 32 and a setting information transmission process section 33.

The authentication information transmission process section 32 (the first processor 31) performs an authentication information transmission process. Specifically, the authentication information transmission process section 32 performs a process of transmitting the first authentication information 28 to the image forming apparatus 400 in response to a request from the image forming apparatus 400. Specifically, the authentication information transmission process section 32 reads the first authentication information 28 from the first storage unit 26. The authentication information transmission process section 32 also transmits the first authentication information 28 read from the first storage unit 26 to the image forming apparatus 400 through the first communication circuit 21.

The setting information transmission process section 33 (the first processor 31) performs a setting information transmission process. Specifically, the setting information transmission process section 33 performs a process of transmitting the setting information 29 to the image forming apparatus 400 in response to a request from the image forming apparatus 400. Specifically, the setting information transmission process section 33 reads the setting information 29 from the first storage unit 26. The setting information transmission process section 33 also transmits the setting information 29 read from the first storage unit 26 to the image forming apparatus 400 through the first communication circuit 21.

Figure 3:
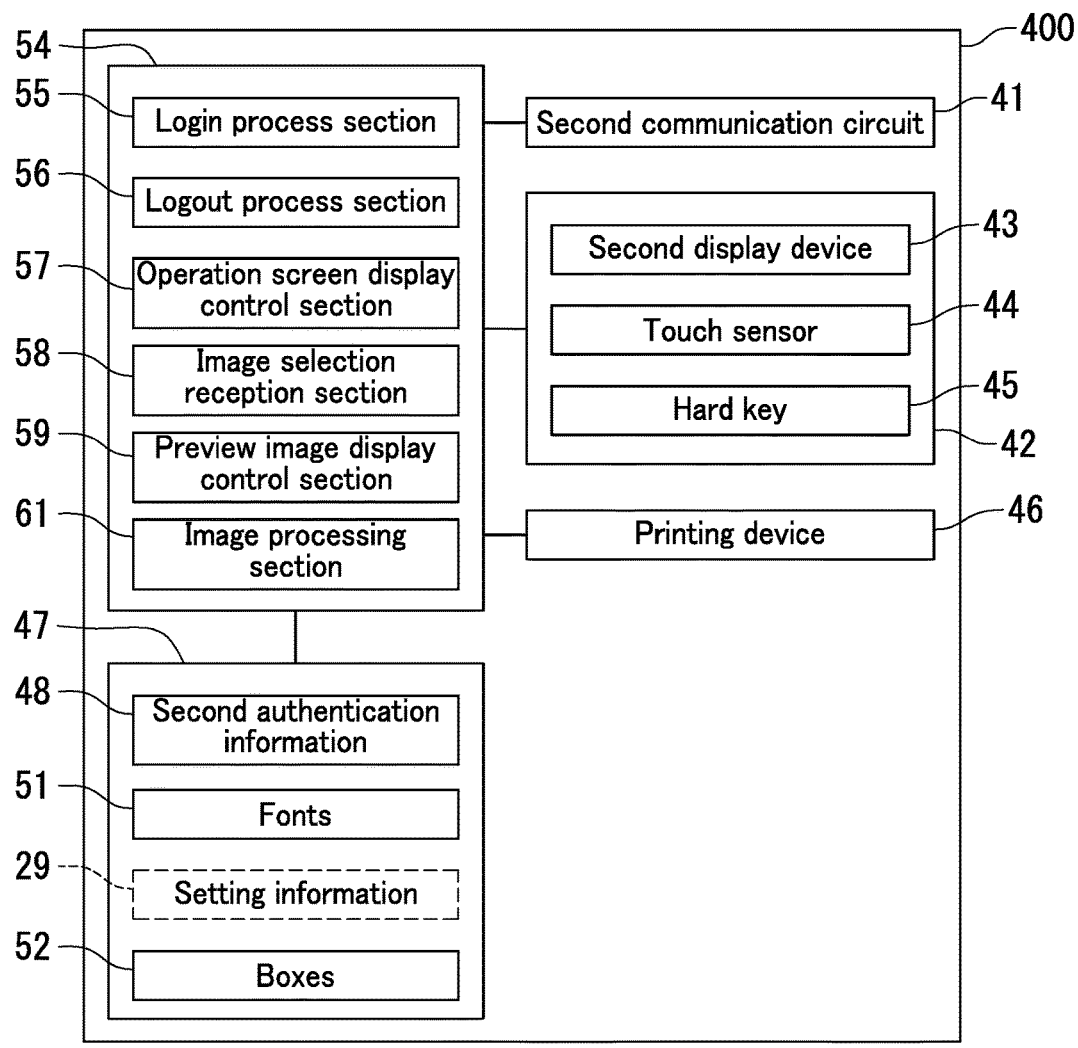
FIG. 3 is a block diagram of an image forming apparatus according to the first embodiment.

FIG. 3 is a block diagram of the image forming apparatus 400. As shown in FIG. 3, the image forming apparatus 400 includes a second communication circuit 41, an operation panel 42, a printing device 46, a second storage unit 47, and a second processor 54.

The second communication circuit 41 is a wireless communication interface for a short-range wireless communication scheme. The image forming apparatus 400 can communicate with electronic apparatuses having a wireless communication interface for the same scheme. In this embodiment, the second communication circuit 41 is a non-contact IC module. The non-contact IC module may include an IC chip and a radio communication antenna (coil of antenna). Therefore, when the user holds the mobile terminal 200 over a portion of the image forming apparatus 400 where the second communication circuit 41 is placed, the mobile terminal 200 can communicate with the image forming apparatus 400. Preferably, the second communication circuit 41 is incorporated inside a horizontal surface of the housing of the image forming apparatus 400. This configuration allows the user to perform various operations while the mobile terminal 200 is placed on the horizontal surface. Therefore, the user can easily perform various operations.

The operation panel 42 includes a second display device 43, a touch sensor 44, and a hard key 45. The second display device 43 displays various screens that are images including various items of information. The second display device 43 is, for example, a liquid crystal display device or an organic EL display device. The second display device 43 includes a drive device for driving the display surface. The touch sensor 44 is disposed on the display surface of the second display device 43. In other words, the operation panel 42 includes a touchscreen. By the user operating various buttons displayed on the touchscreen, various items of information (data) are input to the second processor 54. Similarly, by the user operating the hard key 45, various items of information (data) are input to the second processor 54. The second processor 54 causes the image forming apparatus 400 to perform various operations according to information (data) input from the operation panel 42. Note that when the image forming apparatus 400 includes a touchscreen, the hard key 45 may be removed. When the image forming apparatus 400 includes the hard key 45, the touch sensor 44 may be removed.

The printing device 46 performs an image forming operation on a recording medium, such as paper or the like. The printing device 46 may, for example, be an electrophotographic printing device or an inkjet printing device. A typical electrophotographic printing device includes a photoconductive drum, an optical scanning device, a development device, and a transfer member. The optical scanning device forms an electrostatic latent image on the circumferential surface of the photoconductive drum. The development device supplies toner to the circumferential surface of the photoconductive drum to develop the electrostatic latent image. As a result, a toner image is formed on the circumferential surface of the photoconductive drum. The toner image is transferred to a recording medium by the transfer member. A typical inkjet printing device includes a recording head such as a line head or a serial head. The recording head ejects ink droplets toward a recording medium. An image is formed on the recording medium by the ink droplets landing thereon.

The second storage unit 47 stores a program, setting information, and the like. The second storage unit 47 typically includes a main storage device and an auxiliary storage device. The auxiliary storage device may include, for example, an HDD. The main storage device may include a RAM and a ROM.

In this embodiment, the second storage unit 47 stores second authentication information 48 which is previously registered for each user. The second storage unit 47 also stores various fonts 51 (font data). The fonts 51 are used, for example, when an operation screen is displayed on the second display device 43. The fonts 51 are also used when an image containing a character string is formed on a recording medium.

A box 52 is provided in a storage area possessed by the second storage unit 47 for each user. An image (image data) which can be printed when necessary is registered in each box 52. In other words, the second storage unit 47 stores images (image data) on a box-by-box basis. Each box 52 can accumulate a plurality of images. The user can log in to the image forming apparatus 400, and form, on a recording medium, an image which is registered in their own box 52. The user can also display a preview image of an image which is registered in their own box 52. The second storage unit 47 also temporarily stores the setting information 29 transmitted from the mobile terminal 200.

The second processor 54 executes a program stored in the second storage unit 47 to perform various processes such as numerical calculation, information processing, or apparatus control, and thereby controls operations of the image forming apparatus 400. The second processor 54 includes, for example, a CPU or an MPU. The second processor 54 may further include an application specific integrated circuit (ASIC) for image processing.

In this embodiment, the second processor 54 executes a program stored in the second storage unit 47 to function as a login process section 55, a logout process section 56, an operation screen display control section 57, an image selection reception section 58, a preview image display control section 59, and an image processing section 61.

The login process section 55 (the second processor 54) requests the mobile terminal 200, through the second communication circuit 41, to transmit the first authentication information 28. In response to this, the mobile terminal 200 transmits the first authentication information 28. As a result, when the first authentication information 28 is input to the second processor 54 through the second communication circuit 41, the login process section 55 (the second processor 54) performs a login process. Specifically, the login process section 55 determines whether or not the second authentication information 48 corresponding to the first authentication information 28 received by the second communication circuit 41 is stored in the second storage unit 47. When the second authentication information 48 corresponding to the first authentication information 28 is stored in the second storage unit 47, the login process section 55 determines that the user holding the mobile terminal 200 is an authentic user, i.e., authenticates the user. In other words, the authentication is successful. Meanwhile, when the second authentication information 48 corresponding to the first authentication information 28 is not stored in the second storage unit 47, the authentication fails. When the authentication is successful, the second processor 54 requests the mobile terminal 200, through the second communication circuit 41, to transmit the setting information 29. As a result, the setting information 29 received from the mobile terminal 200 is stored in the second storage unit 47.

The logout process section 56 (the second processor 54) performs a logout process. Specifically, when communication between the mobile terminal 200 (the first communication circuit 21) and the image forming apparatus 400 (the second communication circuit 41) is interrupted, the logout process section 56 performs the logout process. Alternatively, when a predetermined period of time has passed since interruption of communication between the mobile terminal 200 and the image forming apparatus 400, the logout process section 56 performs the logout process. Alternatively, when a predetermined period of time has passed since the latest operation of the user on the operation panel 42, the logout process section 56 performs the logout process. Alternatively, when the user gives an instruction to log out using the operation panel 42, the logout process section 56 performs the logout process. When the logout process is performed, the second processor 54 deletes the setting information 29 from the second storage unit 47 and initializes various settings for the image forming apparatus 400.

The operation screen display control section 57 (the second processor 54) performs an operation screen display process. Specifically, the operation screen display control section 57 reads necessary data (a font 51 or a layout image, etc.) from the second storage unit 47, and displays various operation screens on the second display device 43. The fonts 51 are used to display characters on the operation screen.

The image selection reception section 58 (the second processor 54) performs an image selection reception process. Specifically, the image selection reception section 58 receives an instruction to select at least one from one or more images stored in the second storage unit 47. Specifically, the user who has logged in to the image forming apparatus 400 can operate the operation panel 42 to input an instruction to select an image (image data) to be printed from a plurality of images registered in the user's box 52. The user can also input an instruction to select an image (image data) to be displayed as a preview image from a plurality of images registered in the user's box 52. The image selection reception section 58 receives the user's selection instruction.

The preview image display control section 59 (the second processor 54) performs a preview image display process. Specifically, when an instruction to display a preview image is input through the operation panel 42, the preview image display control section 59 generates a preview image (preview image data) from an image (image data) stored in the second storage unit 47, and displays the preview image on the second display device 43. Specifically, the preview image display control section 59 reads an image selected according to an instruction received by the image selection reception section 58, from the second storage unit 47. The preview image display control section 59 also generates a preview image based on the image read from the second storage unit 47.

When a print instruction is input through the operation panel 42, the image processing section 61 (the second processor 54) performs various image processes on an image (image data) before the image is formed on a recording medium. Specifically, the image processing section 61 reads an image (image data) selected according to an instruction received from the image selection reception section 58, from the second storage unit 47. The image processing section 61 also performs various image processes on the image (image data) read from the second storage unit 47. Examples of the image processes include shading correction, print density adjustment (reflected light correction), color adjustment (color tone correction), and enlargement/reduction.

In this embodiment, the image processing section 61 performs, on an image (image data), an image process based on the setting information 29 of the mobile terminal 200. As a result, the image which has been subjected to the image process is formed on a recording medium. In other words, an image is formed on a recording medium according to the setting information 29 of the mobile terminal 200.

In this embodiment, the print density adjustment process, the color adjustment process, and the enlargement/reduction process are performed according to the setting information 29. Note that any one or two of the print density adjustment process, the color adjustment process, and the enlargement/reduction process may be performed according to the setting information 29.

Specifically, the image processing section 61 adjusts print density according to the font setting information contained in the setting information 29. In other words, print density is adjusted according to a font used by the mobile terminal 200. For example, the image processing section 61 increases print density with an increase in the character width of the font used by the mobile terminal 200.

The image processing section 61 adjust a color according to the language setting information contained in the setting information 29. Specifically, a color is adjusted according to a language for display in the mobile terminal 200. This is because the typical color (perceived color) varies from country to country.

The image processing section 61 also determines an enlargement/reduction rate used in the enlargement/reduction process according to the character size setting information contained in the setting information 29. Specifically, the enlargement/reduction rate is set according to the size of characters displayed on the first display device 22 of the mobile terminal 200. For example, when the character size setting information indicates the maximum character size for the mobile terminal 200, the image processing section 61 sets the enlargement rate to a maximum value which does not increase the number of pages.

Moreover, in this embodiment, the preview image display control section 59 sets the enlargement/reduction rate of a preview image according to information about the enlargement/reduction rate contained in the setting information 29. Specifically, a preview image is displayed at an enlargement/reduction rate corresponding to the enlargement/reduction rate of a screen (image) displayed on the first display device 22 of the mobile terminal 200. The enlargement/reduction rate contained in the setting information 29 may be an enlargement/reduction rate which is used, for example, when the mobile terminal 200 displays a web browser on the first display device 22.

The first embodiment has been described above. According to the first embodiment, the image forming apparatus 400 can form an image on a recording medium according to the setting information 29 of the mobile terminal 200.

Moreover, the image forming apparatus 400 can display a preview image according to the setting information 29 of the mobile terminal 200. Therefore, the user can adjust settings such as print density and the like to their preferred values, without operating the operation panel 42. In addition, the image forming system 100 can adjust settings for the image forming apparatus 400 according to the setting information 29 which is used in the mobile terminal 200. Therefore, it is not necessary to store setting information dedicated to the image forming apparatus 400 in the mobile terminal 200. Therefore, settings for the image forming apparatus 400 can be changed without a reduction in the free space of the storage capacity of the mobile terminal 200.

Note that when the setting information 29 of the mobile terminal 200 is updated during communication between the mobile terminal 200 and the image forming apparatus 400, the mobile terminal 200 may transmit the updated setting information 29 to the image forming apparatus 400. By receiving the updated setting information 29, the image forming apparatus 400 can form an image on a recording medium according to the latest setting information 29 of the mobile terminal 200. The image forming apparatus 400 can also display a preview image according to the latest setting information 29 of the mobile terminal 200. In other words, the user can change settings for the image forming apparatus 400 by changing settings for the mobile terminal 200, without operating the operation panel 42 of the image forming apparatus 400.

Second Embodiment

Next, a second embodiment will be described with reference to FIGS. 4 and 5. Note that differences between the second embodiment and the first embodiment will be described, and similarities between the second embodiment and the first embodiment will not be described. The second embodiment is different from the first embodiment in the configuration of the image forming apparatus 400.

Figure 4:
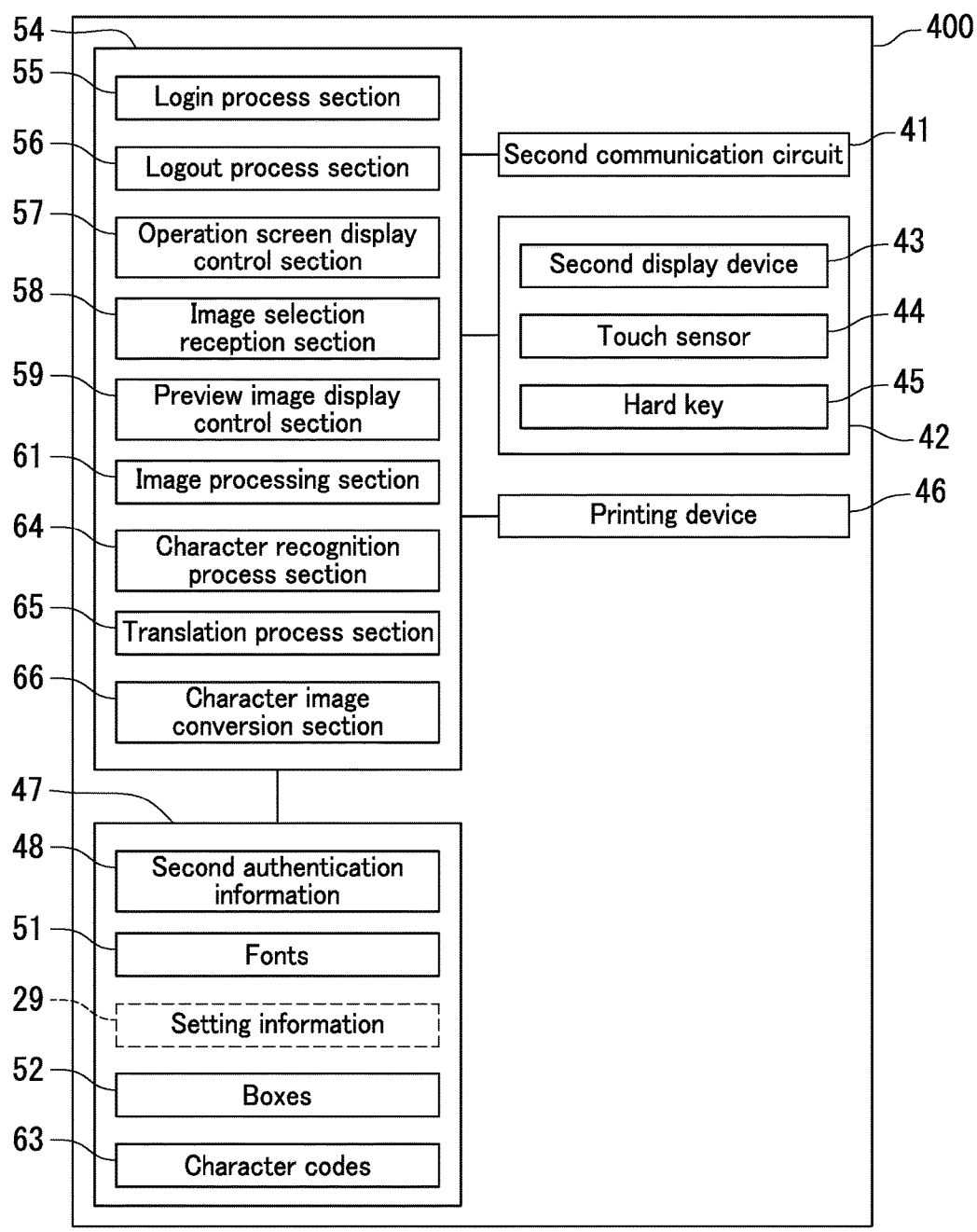
FIG. 4 is a block diagram of an image forming apparatus according to the second embodiment.

FIG. 4 is a block diagram of an image forming apparatus 400 according to the second embodiment. As shown in FIG. 4, in the image forming apparatus 400, the second storage unit 47 further stores character codes 63. The character codes 63 include character codes of various languages. The second processor 54 executes a program stored in the second storage unit 47 to further function as a character recognition process section 64, a translation process section 65, and a character image conversion section 66.

The character recognition process section 64 (the second processor 54) performs a character recognition process. The character recognition process may be optical character recognition (OCR). Specifically, the character recognition process section 64 generates a first character code string in a first language from a first character string image (first character string image data) included in an image (image data) selected according to an instruction received by the image selection reception section 58, by referring to the character codes 63. In other words, when a character string in a certain language (first language) is included in an image selected by the user, the character recognition process section 64 generates a character code string (first character code string) in that language (first language).

The translation process section 65 (the second processor 54) performs a translation process of generating a second character code string corresponding to a first character code string by referring to the character codes 63. Specifically, the translation process section 65 converts a first character code string into a second character code string in a second language according to the language setting information contained in the setting information 29. In other words, a first character code string is converted into a character code string (second character code string) in a language (second language) for display in the mobile terminal 200.

The character image conversion section 66 (the second processor 54) performs a character image conversion process of replacing a first character string image (first character string image data) with a second character string image (second character string image data) corresponding to a second character code string. Specifically, the character image conversion section 66 generates a second character string image (second character string image data) by generating a character image (character image data) corresponding to each character code contained in a second character code string. The character image conversion section 66 also performs, on an image (image data) selected by the user, a process of replacing a first character string image (first character string image data) contained in the image with a second character string image (second character string image data). As a result, the character image conversion section 66 generates a new image (image data) in which the first character string contained in the image selected by the user is translated into a language (second language) for display in the mobile terminal 200.

The printing device 46, when forming an image selected by the user on a recording medium, forms the image on which translation has been performed by the character image conversion section 66 (the second processor 54) on the recording medium. In other words, the printing device 46 forms, on a recording medium, an image containing a character string image in a language (second language) for display in the mobile terminal 200. Therefore, when a character string is contained in an image for which a print instruction has been issued, the user can acquire an image in which the character string has been translated into a language set in the mobile terminal 200. Therefore, the user can easily check and understand a printed image (e.g., a document).

The preview image display control section 59 (the second processor 54), when displaying a preview image of an image selected by the user on the second display device 43, also generates a preview image of the image on which translation has been performed by the character image conversion section 66. In other words, the preview image display control section 59 displays, on the second display device 43, a preview image containing a character string image in a language (second language) for display in the mobile terminal 200. Therefore, when a character string is contained in an image for which a preview image display instruction has been issued, the user can check a preview image of the image in which the character string has been translated into a language set in the mobile terminal 200. Therefore, the user can easily check and understand a preview image of an image (e.g., a document) to be printed.

As described above, according to the second embodiment, the image forming apparatus 400 can form an image on a recording medium according to the setting information (language setting information) of the mobile terminal 200. The image forming apparatus 400 can also display a preview image according to the setting information (language setting information) of the mobile terminal 200.

Figure 5:
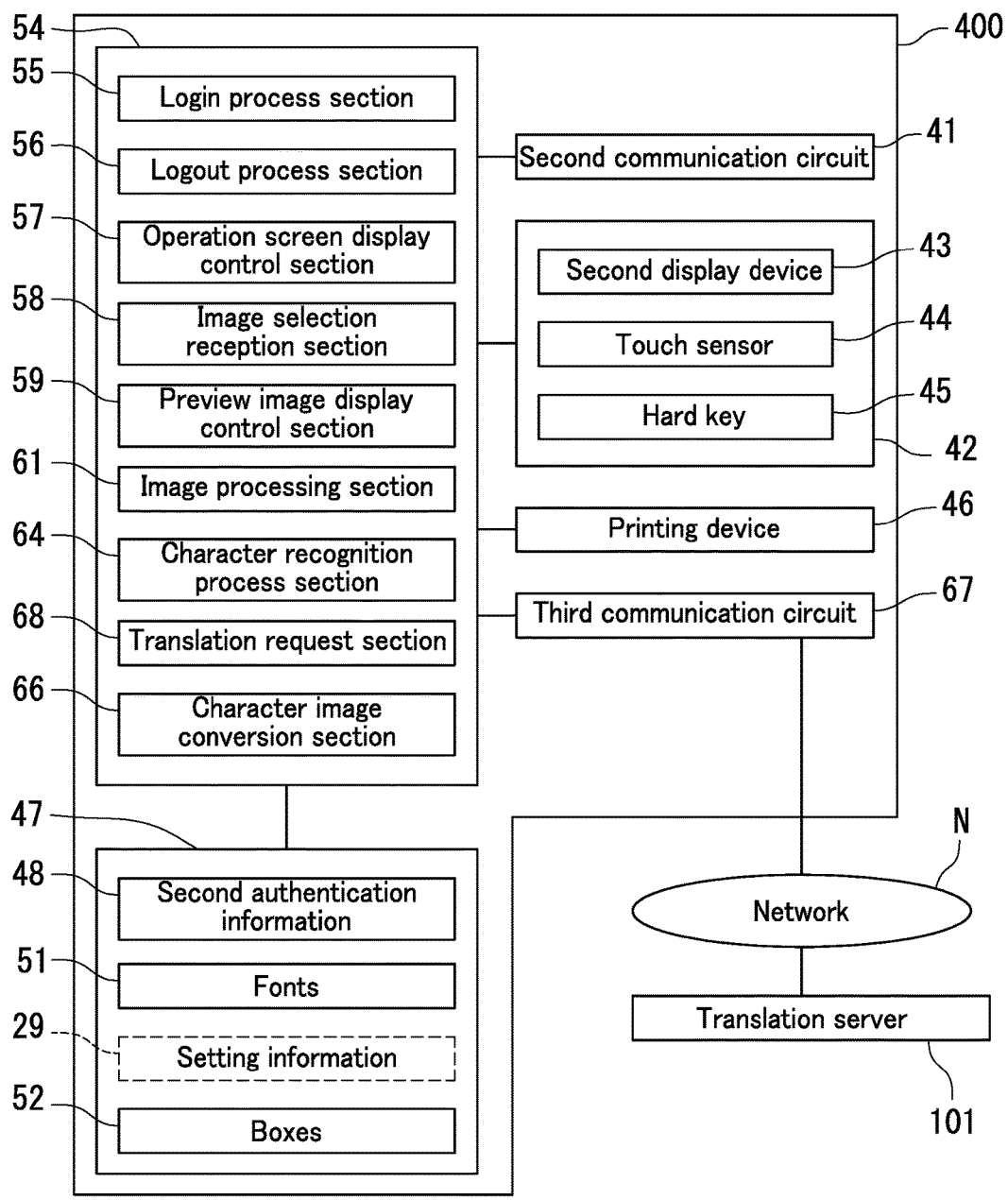
FIG. 5 is a block diagram of an image forming apparatus according to a variation of the second embodiment.

Although, in this embodiment, it is assumed that the image forming apparatus 400 performs translation, the image forming apparatus 400 may cause an external translation server 101 to perform translation as shown in FIG. 5.

FIG. 5 is a block diagram of a variation of the image forming apparatus 400 according to the second embodiment.

The image forming apparatus 400 shown in FIG. 5 further includes a third communication circuit 67. The third communication circuit 67, which is, for example, a communication interface, controls communication with other apparatuses through a network N. The network N may, for example, include at least one of the Internet network, a local area network (LAN), and a public telephone network. In this embodiment, the third communication circuit 67 communicates with a translation server (external translation apparatus) through the network N.

In the image forming apparatus 400 shown in FIG. 5, the second processor 54 executes a program stored in the second storage unit 47 to function as a character recognition process section 64, a translation request section 68, and a character image conversion section 66.

The translation request section 68 (the second processor 54) performs a translation request process. The translation request process is to request a translation server 101, through the third communication circuit 67, to translate into a language according to the language setting information contained in the setting information 29. Specifically, the translation request section 68 identifies a language set in the mobile terminal 200 on the basis of the language setting information contained in the setting information 29. The translation request section 68 also requests the translation server 101 to translate a character code string (first character code string) generated by the character recognition process section 64 into a character code string (second character code string) in a language (second language) for display in the mobile terminal 200. Specifically, the translation request section 68 transmits a first character code string, together with information indicating a language set in the mobile terminal 200, to the translation server 101 through the third communication circuit 67.

The character image conversion section 66 (the second processor 54) performs a character image conversion process of replacing a first character string image (first character string image data) with a second character string image (second character string image data) corresponding to a second character code string received from the translation server 101 through the third communication circuit 67. Specifically, the character image conversion section 66 generates a character image (character image data) corresponding to each character code contained in a second character code string, and thereby generates a second character string image (second character string image data). The character image conversion section 66 also performs, on an image (image data) selected by the user, a process of replacing a first character string image (first character string image) contained in the image with a second character string image (second character string image data). As a result, the character image conversion section 66 converts an image selected by the user into a new image (image data) in which a first character string contained in that image has been translated into a language (second language) displayed on the first display device 22 of the mobile terminal 200.

Third Embodiment

Next, a third embodiment will be described with reference to FIGS. 6 and 7. Note that differences between the third embodiment and the first and second embodiments will be described, and similarities between the third embodiment and the first and second embodiments will not be described.

The third embodiment is different from the first and second embodiments in the configuration of the image forming apparatus 400.

Figure 6:
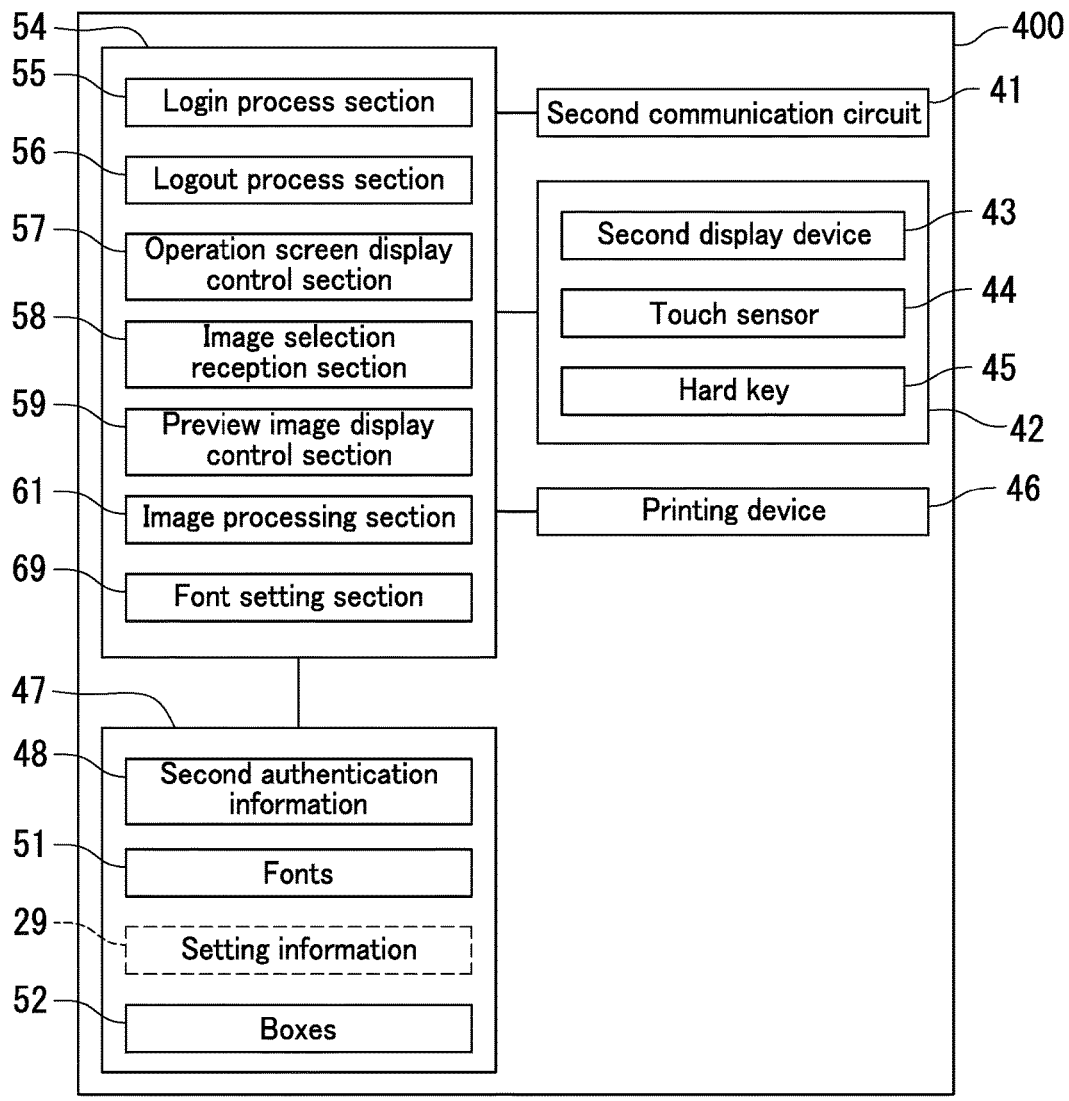
FIG. 6 is a block diagram of an image forming apparatus according to the third embodiment.

FIG. 6 is a block diagram of an image forming apparatus 400 according to the third embodiment. As shown in FIG. 6, in the image forming apparatus 400, the second processor 54 executes a program stored in the second storage unit 47 to further function as a font setting section 69.

The font setting section 69 (the second processor 54) performs a font setting process. Specifically, the font setting section 69 sets a font of a character to be displayed on an operation screen, according to the font setting information contained in the setting information 29. As a result, the font of the character displayed on the operation screen (the second display device 43) is the same as a font of the character displayed on the first display device 22 of the mobile terminal 200. Specifically, the operation screen display control section 57 (the second processor 54) reads a font 51 corresponding to the font setting information contained in the setting information 29 from various fonts 51 stored in the second storage unit 47. The operation screen display control section 57 also displays an operation screen on the second display device 43 using the font 51 read from the second storage unit 47.

As described above, according to the third embodiment, the image forming apparatus 400 can display a screen (image) on the operation panel 42 according to the setting information (font setting information) of the mobile terminal 200. Specifically, a font of a character displayed on the operation panel 42 (the second display device 43) is changed according to the setting information (font setting information) of the mobile terminal 200.

Note that the image forming apparatus 400 may acquire a font used by the mobile terminal 200 from an external server. FIG. 7 is a block diagram of a variation of the image forming apparatus 400 according to the third embodiment. The image forming apparatus 400 shown in FIG. 7 acquires a font used by the mobile terminal 200 from an external server 102. Specifically, when a font 51 corresponding to the font setting information contained in the setting information 29 is not included in the fonts 51 stored in the second storage unit 47, the image forming apparatus 400 shown in FIG. 7 accesses the external server 102. In other words, when a font used by the mobile terminal 200 is not stored in the second storage unit 47, the image forming apparatus 400 acquires the font used by the mobile terminal 200 from the external server 102.

Figure 7:
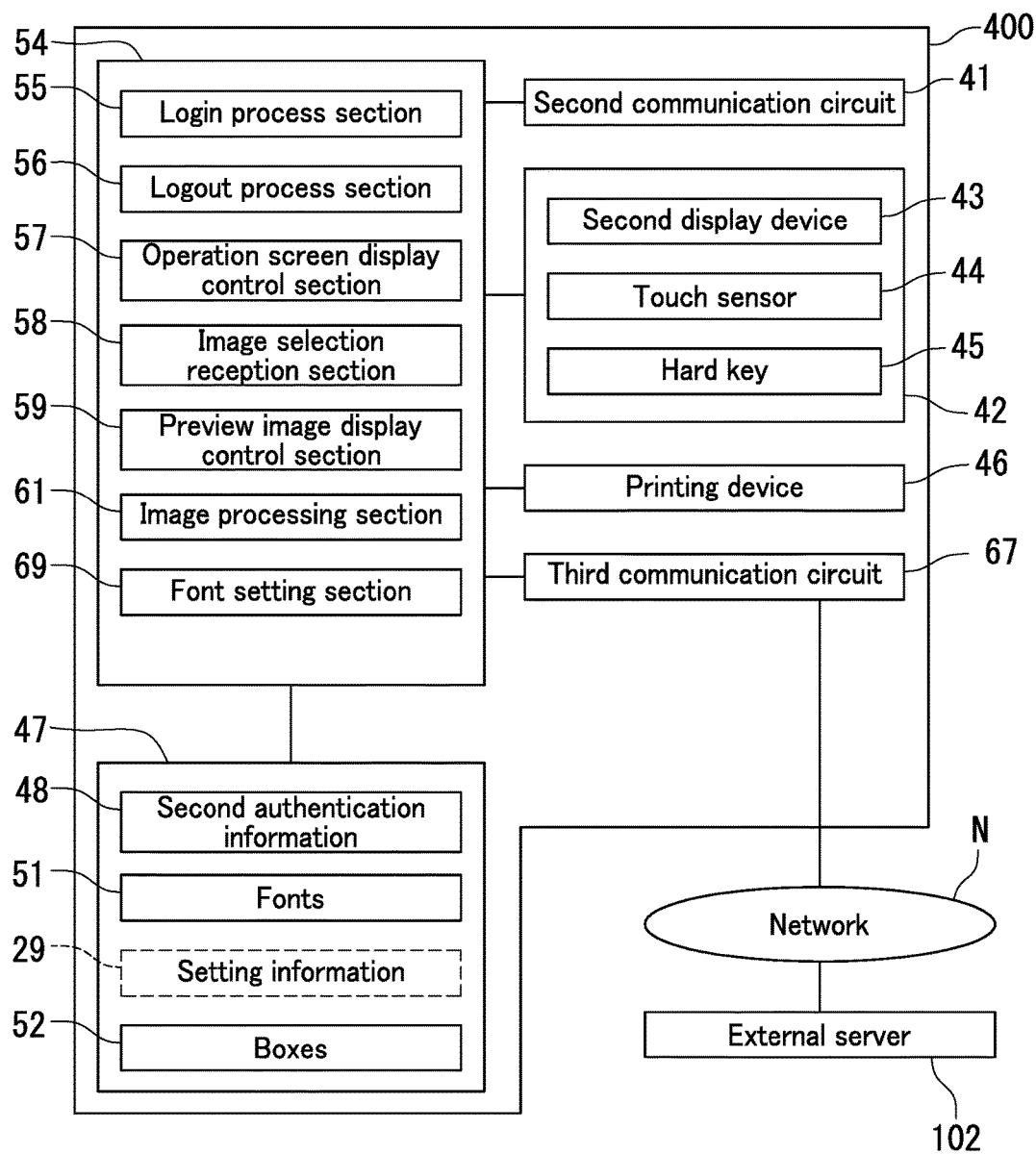
FIG. 7 is a block diagram of an image forming apparatus according to a variation of the third embodiment.

The image forming apparatus 400 shown in FIG. 7 further includes a third communication circuit 67. In this embodiment, the third communication circuit 67, which is, for example, a communication interface, controls communication with the external server 102 (external apparatus) through a network N.

In the image forming apparatus 400 shown in FIG. 7, the font setting section 69 (the second processor 54) performs a font data request process. Specifically, the font setting section 69 requests the external server 102, through the third communication circuit 67, to transmit a font (font data) corresponding to the font setting information contained in the setting information 29. Specifically, the font setting section 69 transmits information indicating a font used by the mobile terminal 200, to the external server 102, according to the font setting information contained in the setting information 29. The font setting section 69 also stores, to the second storage unit 47, a font (font data) received from the external server 102 through the third communication circuit 67. As a result, a font of a character displayed on the operation panel 42 (the second display device 43) is changed according to the setting information (font setting information) of the mobile terminal 200.

Fourth Embodiment

Next, a fourth embodiment will be described with reference to FIG. 8. Note that differences between the fourth embodiment and the first to third embodiments will be described, and similarities between the fourth embodiment and the first to third embodiments will not be described. The fourth embodiment is different from the first to third embodiments in the configuration of the image forming apparatus 400.

Figure 8:
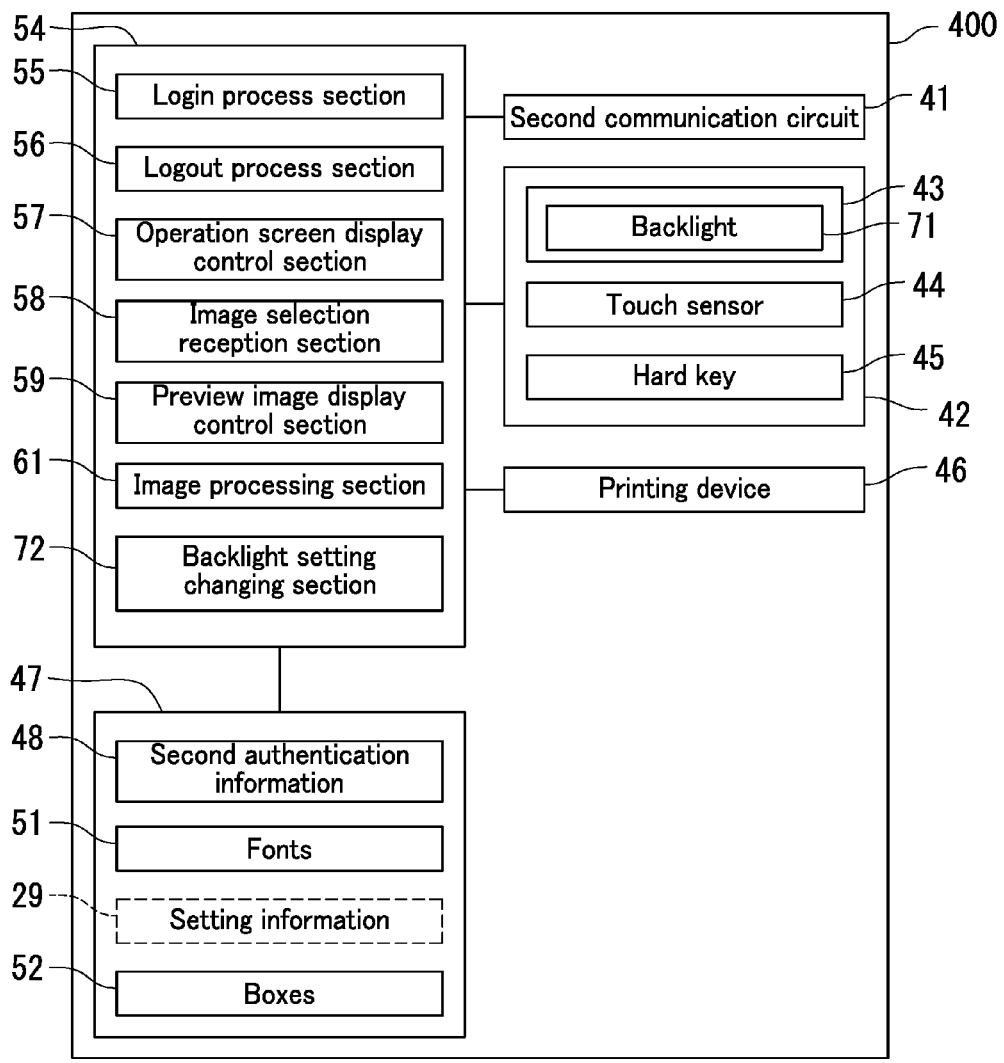
FIG. 8 is a block diagram of an image forming apparatus according to the fourth embodiment.

FIG. 8 is a block diagram of an image forming apparatus 400 according to the fourth embodiment. As shown in FIG. 8, in the image forming apparatus 400, the second processor 54 executes a program stored in the second storage unit 47 to further function as a backlight setting changing section 72.

The backlight setting changing section 72 (the second processor 54) performs a backlight setting changing process. Specifically, the backlight setting changing section 72 changes a setting for a backlight of the second display device 43 according to backlight setting information contained in the setting information 29. Specifically, the backlight setting information may contain setting information about a period of time when the backlight is on. The backlight setting information may also contain setting information about the luminance of the backlight.

The setting information about a period of time when the backlight is on, which is contained in the setting information 29, is hereinafter referred to as the lighting time information. The period of time when the backlight is on, which is set in the mobile terminal 200, is hereinafter referred to as the lighting time set in the mobile terminal 200. The setting information about the luminance of the backlight, which is contained in the setting information 29, is hereinafter referred to as the brightness setting information. The luminance of the backlight set in the mobile terminal 200 is hereinafter referred to as the luminance set in the mobile terminal 200.

The lighting time information indicates a period of time when the backlight included in the first display device 22 continues to be on after the user's last operation on the mobile terminal 200. In other words, when a predetermined time (backlight lighting time) has passed since the user's last operation on the mobile terminal 200, the backlight of the first display device 22 is turned off. When the setting information 29 contains the lighting time information, the lighting time of a backlight 71 included in the second display device 43 is set according to the lighting time set in the mobile terminal 200. For example, when the lighting time set in the mobile terminal 200 is two minutes, the backlight setting changing section 72 sets the lighting time of the backlight 71 to two minutes. Therefore, when two minutes (backlight lighting time) have passed since the user's last operation on the image forming apparatus 400, the backlight 71 is turned off under the control of the second processor 54.

The luminance setting information indicates the luminance of the backlight of the first display device 22 included in the mobile terminal 200. Therefore, when the setting information 29 contains the luminance setting information, the luminance of the backlight 71 is set according to the luminance set in the mobile terminal 200. For example, the backlight setting changing section 72 sets the luminance of the backlight 71 to the luminance set in the mobile terminal 200. As a result, the backlight 71 emits light at the same luminance as that of the backlight of the mobile terminal 200 under the control of the second processor 54.

As described above, according to the fourth embodiment, the image forming apparatus 400 can be set according to a setting for the backlight of the mobile terminal 200. Therefore, when the mobile terminal 200 is in an energy saving mode, the image forming apparatus 400 can be changed to an energy saving mode.

Note that a setting for the backlight 71 may not be the same as a setting for the backlight of the mobile terminal 200. For example, when the lighting time set in the mobile terminal 200 is shorter than the minimum lighting time of the backlight 71 specified in the image forming apparatus 400, the backlight setting changing section 72 sets the lighting time of the backlight 71 to the minimum lighting time. For example, when the minimum lighting time of the backlight 71 is one minute, and the lighting time set in the mobile terminal 200 is 30 seconds, the backlight setting changing section 72 sets the lighting time of the backlight 71 to one minute. Similarly, when the luminance set in the mobile terminal 200 is lower than the minimum luminance of the backlight 71 specified in the image forming apparatus 400, the backlight setting changing section 72 sets the luminance of the backlight 71 to the minimum luminance. Thus, settings for the image forming apparatus 400 which have been made according to settings for the mobile terminal 200 may not be the same as the settings for the mobile terminal 200.

The backlight setting changing section 72 may also initialize a setting for the backlight 71 when a predetermined period of time has passed since the logout process performed by the logout process section 56 (the second processor 54). In this case, of the information contained in the setting information 29, the backlight setting information is deleted from the second storage unit 47 when a predetermined period of time has passed since the execution of the logout process. In a configuration in which the backlight setting is thus not initialized immediately after the execution of the logout process, the frequency of changing of the luminance of the second display device 43 can be reduced, for example.

Fifth Embodiment

Next, a fifth embodiment will be described with reference to FIG. 9. Note that differences between the fifth embodiment and the first to fourth embodiments will be described, and similarities between the fifth embodiment and the first to fourth embodiments will not be described. The fifth embodiment is different from the first to fourth embodiments in the configuration of the image forming apparatus 400.

Figure 9:
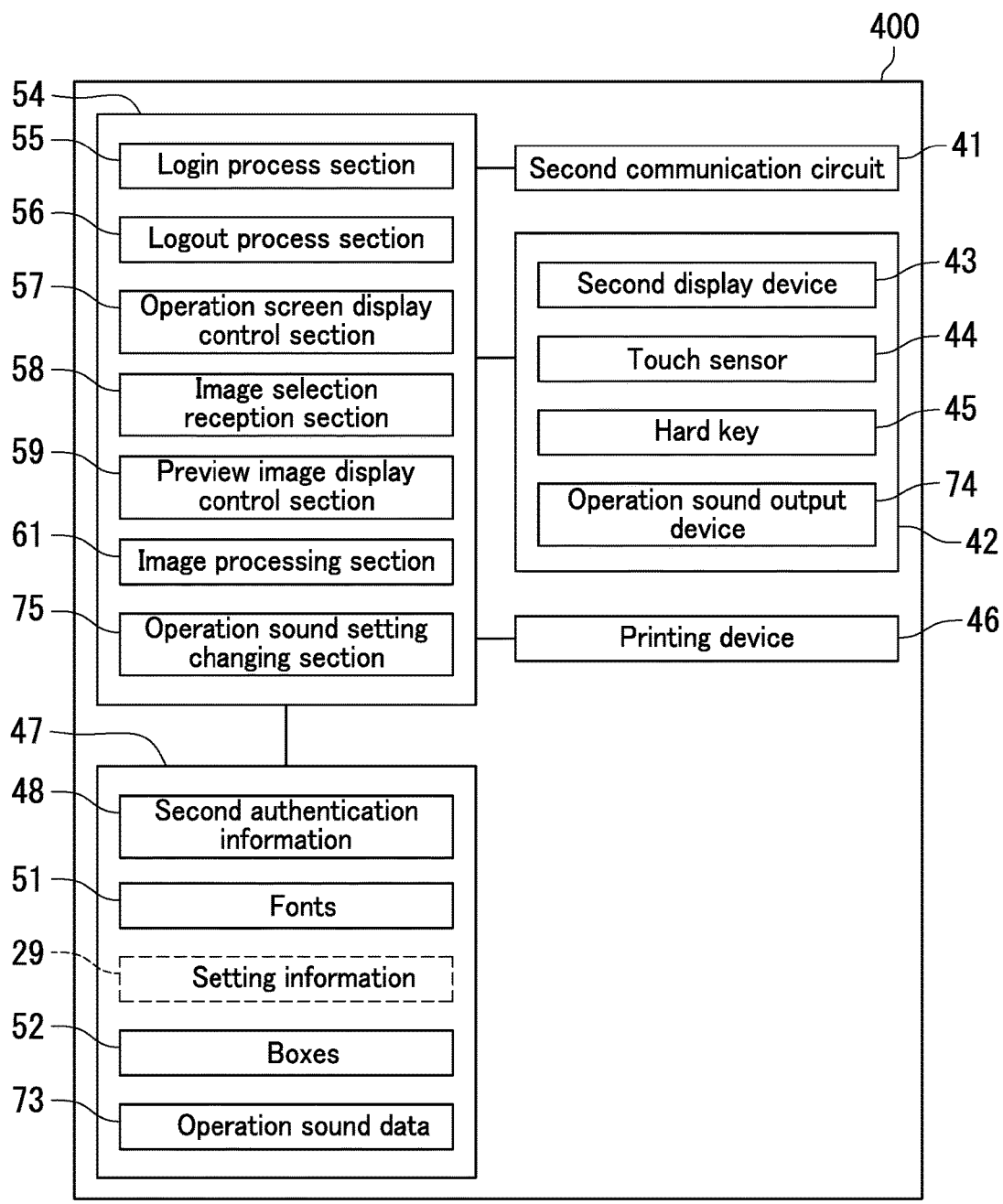
FIG. 9 is a block diagram of an image forming apparatus according to the fifth embodiment.

FIG. 9 is a block diagram of an image forming apparatus 400 according to the fifth embodiment. As shown in FIG. 9, in the image forming apparatus 400, the operation panel 42 further includes an operation sound output device 74. The second storage unit 47 also further stores operation sounds 73 (operation sound data). The second processor 54 can output operation sounds from the operation sound output device 74. The operation sound output device 74 may, for example, be a loudspeaker.

The second processor 54 executes a program stored in the second storage unit 47 to further function as an operation sound setting changing section 75. The operation sound setting changing section 75 (the second processor 54) performs an operation sound setting process. Specifically, the operation sound setting changing section 75 switches on/off the operation sound of the operation panel 42 according to the operation sound setting information contained in the setting information 29. Specifically, when the operation sound is on in the mobile terminal 200, the operation sound setting changing section 75 sets the output of the operation sound of the operation panel 42 to "on." Meanwhile, when the operation sound is off in the mobile terminal 200, the operation sound setting changing section 75 sets the output of the operation sound of the operation panel 42 to "off."

As described above, according to the fifth embodiment, the image forming apparatus 400 can be set according to a setting for switching on/off the operation sound of the mobile terminal 200. Therefore, settings for the image forming apparatus 400 (a setting for switching on/off the operation sound) can be automatically made according to the user's preferred settings.

Sixth Embodiment

Next, a sixth embodiment will be described with reference to FIG. 10. Note that differences between the sixth embodiment and the first to fifth embodiments will be described, and similarities between the sixth embodiment and the first to fifth embodiments will not be described. The sixth embodiment is different from the first to fifth embodiments in the configuration of the image forming apparatus 400.

Figure 10:
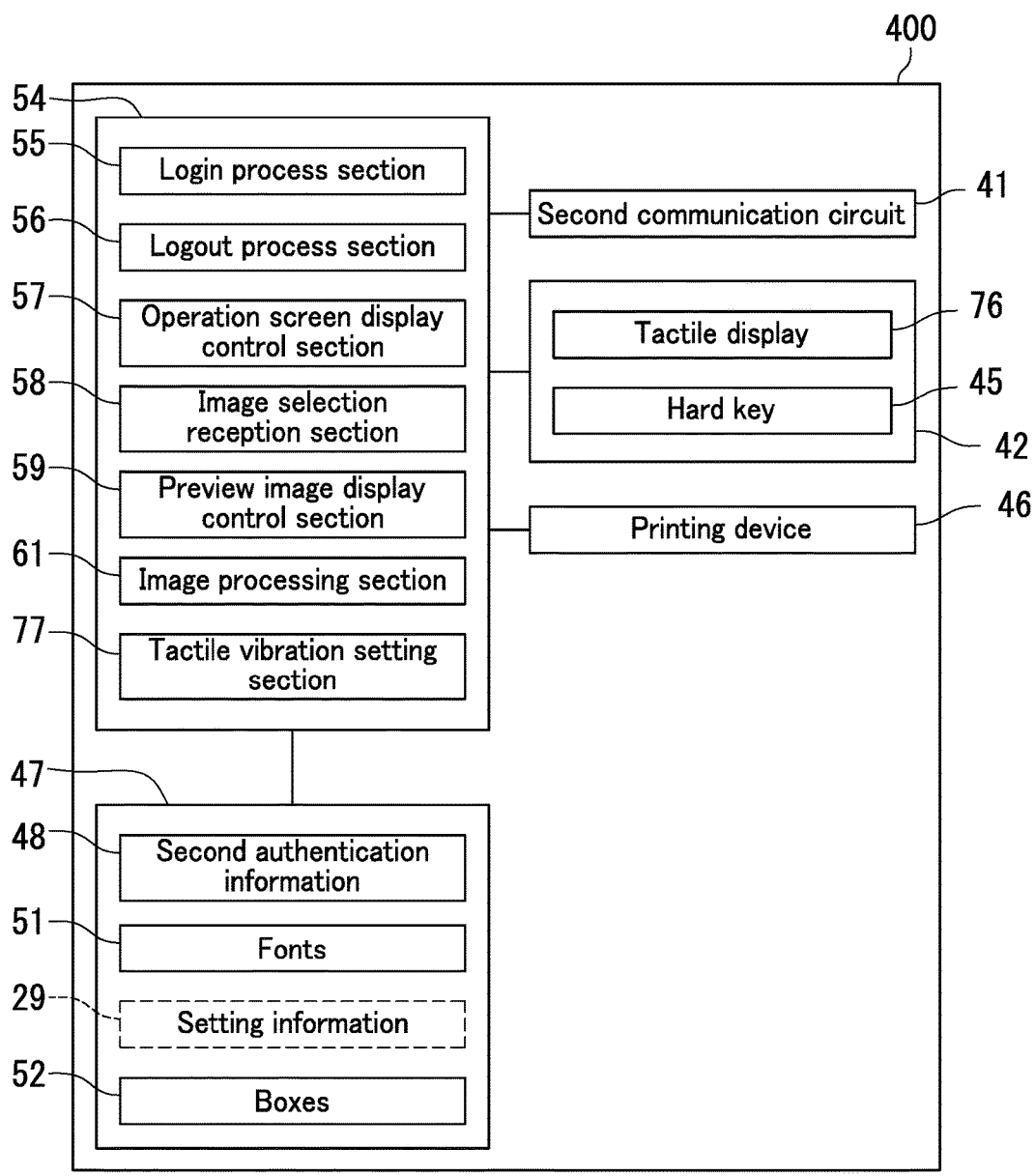
FIG. 10 is a block diagram of an image forming apparatus according to the sixth embodiment.

FIG. 10 is a block diagram of an image forming apparatus 400 according to the sixth embodiment. As shown in FIG. 10, in the sixth embodiment, the operation panel 42 of the image forming apparatus 400 includes a tactile display 76 and a hard key 45. The second processor 54 also executes a program stored in the second storage unit 47 to further function as a tactile vibration setting section 77.

The tactile display 76 displays various screens that are images including various items of information. The tactile display 76 also has a touch sensor function. The tactile display 76 also presents tactile sensation to the user. In this embodiment, the tactile display 76 presents tactile vibrations to the user.

For example, the tactile display 76 includes a liquid crystal display device, a touch sensor, and an electrification film. The touch sensor may be disposed on the liquid crystal panel. The electrification film may be disposed on the touch sensor. In this case, the second processor 54 controls a voltage applied to the electrification film. This control can generate an electrostatic force between the electrification film and the human body (e.g., a fingertip), and thereby present tactile vibrations to the user.

Alternatively, the tactile display 76 may include an ultrasonic vibrator array instead of the electrification film. In this case, the second processor 54 controls the operation of the ultrasonic vibrator array. This control can generate a focus of ultrasonic waves at any spatial position above the ultrasonic vibrator array, and thereby present tactile vibrations to the user.

Alternatively, the tactile display 76 may include a vibration device such as a piezoelectric device instead of an electrification film. The vibration device may be disposed at a periphery of the liquid crystal panel. In this case, the second processor 54 drives the vibration device to present tactile vibrations to the user.

The tactile vibration setting section 77 (the second processor 54) performs a tactile vibration setting process. Specifically, the tactile vibration setting section 77 switches on/off the presentation of tactile vibrations by the tactile display 76 according to vibration setting information contained in the setting information 29. Specifically, when the vibration function is on in the mobile terminal 200, the tactile vibration setting section 77 sets the presentation of tactile vibrations by the tactile display 76 to "on." Meanwhile, when the vibration function is off in the mobile terminal 200, the tactile vibration setting section 77 sets the presentation of tactile vibrations by the tactile display 76 to "off."

As described above, according to the sixth embodiment, the image forming apparatus 400 can be set according to a setting for switching on/off the vibration function in the mobile terminal 200. Therefore, settings for the image forming apparatus 400 (a setting for switching on/off the tactile vibrations) can be automatically made according to the user's preferred settings.

Seventh Embodiment

Next, a seventh embodiment will be described with reference to FIG. 11. Note that differences between the seventh embodiment and the first to sixth embodiments will be described, and similarities between the seventh embodiment and the first to sixth embodiments will not be described. The seventh embodiment is different from the first to sixth embodiments in the configuration of the image forming apparatus 400.

Figure 11:
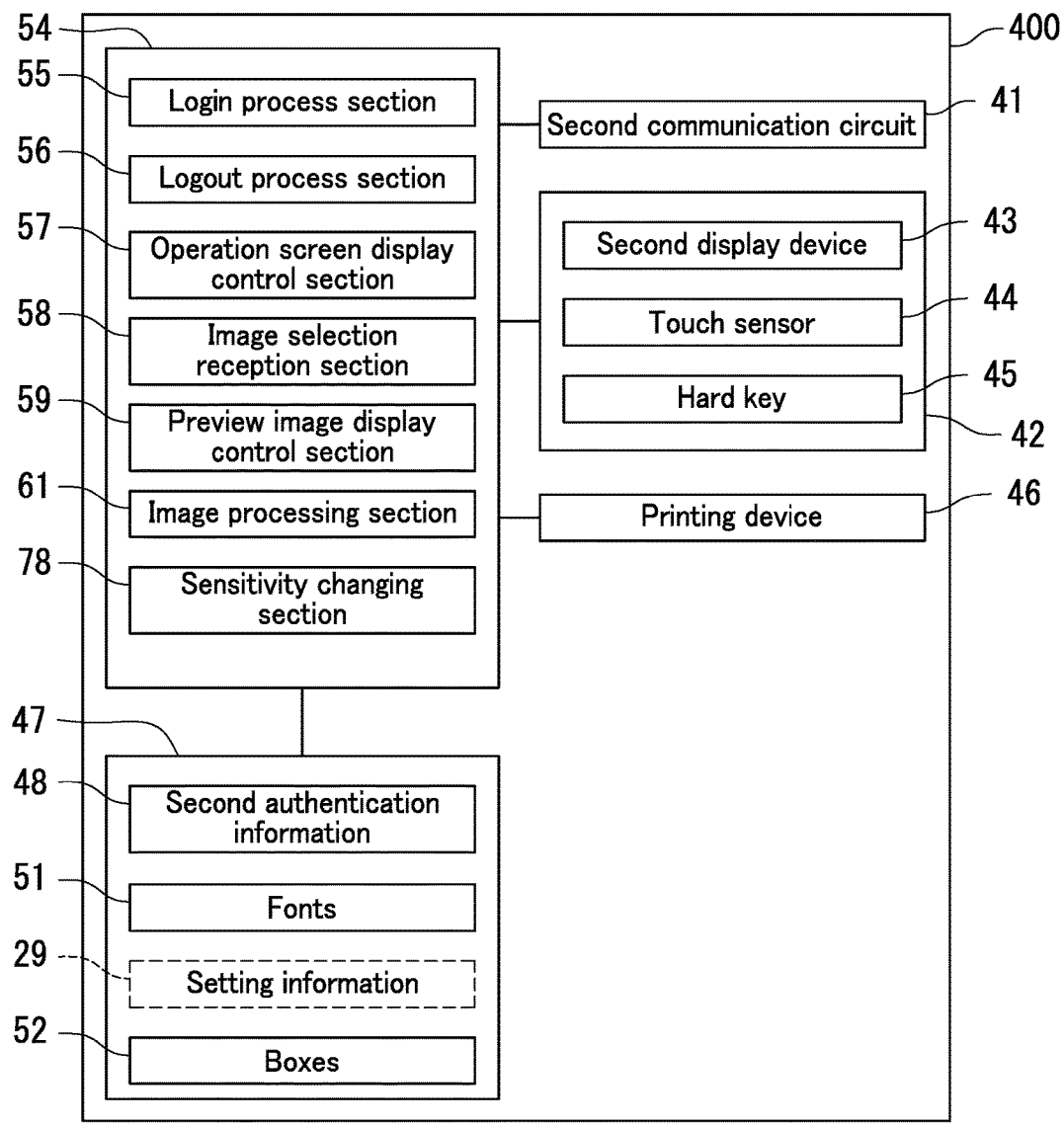
FIG. 11 is a block diagram of an image forming apparatus according to the seventh embodiment.

FIG. 11 is a block diagram of an image forming apparatus 400 according to the seventh embodiment. As shown in FIG. 11, in the seventh embodiment, the second processor 54 of the image forming apparatus 400 executes a program stored in the second storage unit 47 to further function as a sensitivity changing section 78.

The sensitivity changing section 78 (the second processor 54) performs a process of changing a setting for the sensitivity of the touch sensor 44. Specifically, the sensitivity changing section 78 changes a setting for the sensitivity of the touch sensor 44 according to information about the sensitivity of the touch sensor 24 contained in the setting information 29. Specifically, the sensitivity information of the touch sensor 24 indicates the touch detection sensitivity of the touch sensor 24. The sensitivity changing section 78 changes the touch detection sensitivity of the touch sensor 44 according to the touch detection sensitivity set in the mobile terminal 200.

As described above, according to the seventh embodiment, the image forming apparatus 400 can be set according to a setting for the sensitivity of the touch sensor 24 in the mobile terminal 200. Therefore, settings for the image forming apparatus 400 (touch detection sensitivity) can be automatically made according to the user's preferred settings.

Eighth Embodiment

Next, an eighth embodiment will be described with reference to FIGS. 12 and 13. Note that differences between the eighth embodiment and the first to seventh embodiments will be described, and similarities between the eighth embodiment and the first to seventh embodiments will not be described. The eighth embodiment is different from the first to seventh embodiments in the respective configurations of the mobile terminal 200 and the image forming apparatus 400.

Figure 12:
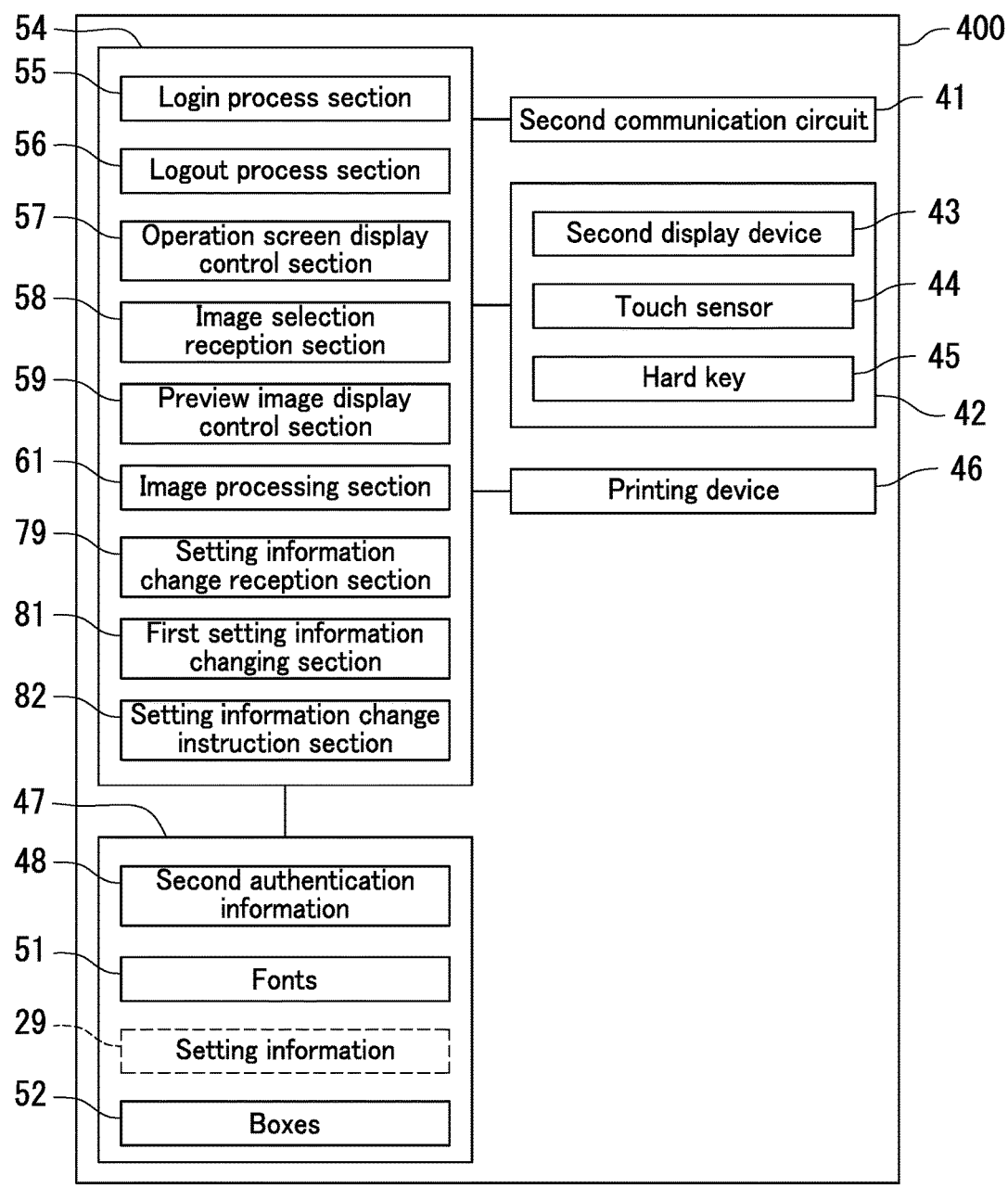
FIG. 12 is a block diagram of an image forming apparatus according to the eighth embodiment.

FIG. 12 is a block diagram of an image forming apparatus 400 according to the eighth embodiment. As shown in FIG. 12, in the eighth embodiment, the second processor 54 of the image forming apparatus 400 executes a program stored in the second storage unit 47 to further function as a setting information change reception section 79, a first setting information changing section 81, and a setting information change instruction section 82.

The setting information change reception section 79 (the second processor 54) performs a setting information change reception process. Specifically, the setting information change reception section 79 receives an instruction to change the setting information 29, which is input through the operation panel 42. The first setting information changing section 81 (the second processor 54) performs a setting information changing process. Specifically, the first setting information changing section 81 changes the setting information 29 according to the instruction received by the setting information change reception section 79. The setting information change instruction section 82 (the second processor 54) performs a setting information change instruction process. Specifically, the setting information change instruction section 82 instructs the mobile terminal 200 to change the setting information 29 stored in the first storage unit 26 to the setting information 29 changed by the first setting information changing section 81. Specifically, when the setting information 29 stored in the second storage unit 47 has been changed, the setting information change instruction section 82 reads the setting information 29 from the second storage unit 47. The setting information change instruction section 82 also transmits the setting information 29 (the changed setting information 29) read from the second storage unit 47 to the mobile terminal 200 through the second communication circuit 41.

Figure 13:
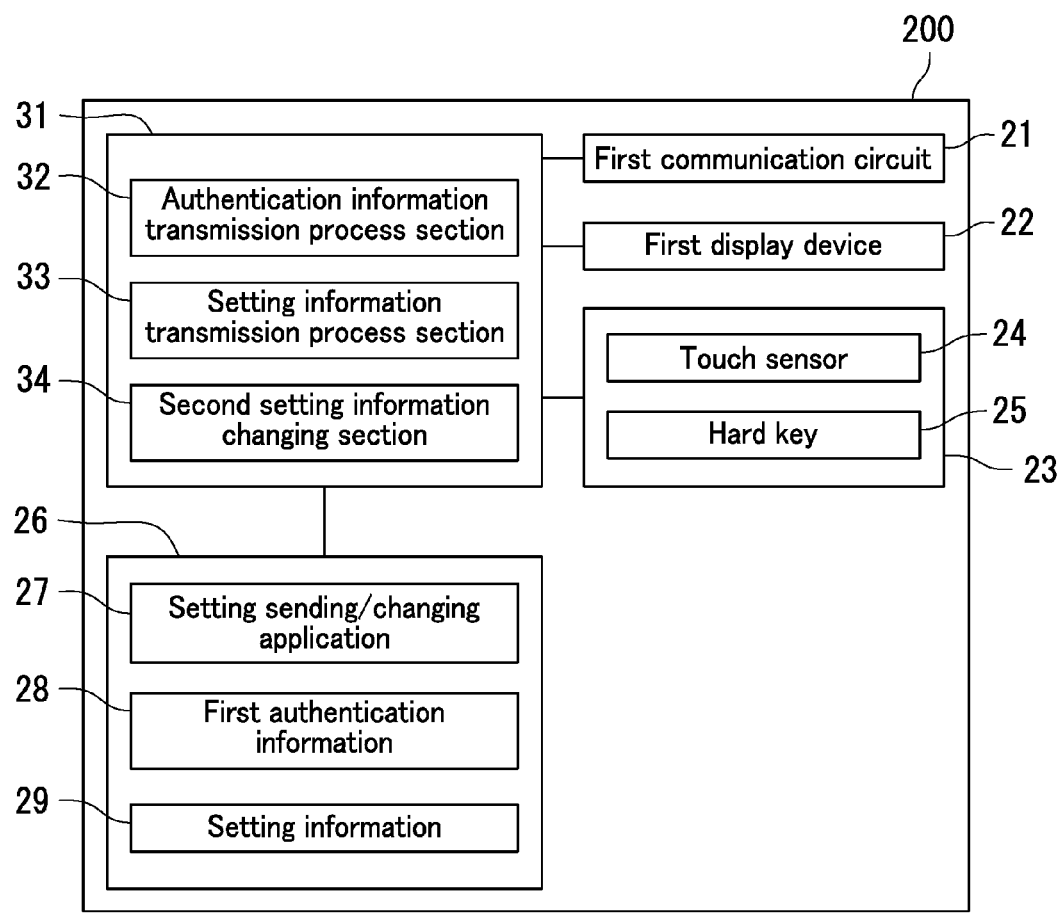
FIG. 13 is a block diagram of a mobile terminal according to the eighth embodiment.

FIG. 13 is a block diagram of a mobile terminal 200 according to the eighth embodiment. As shown in FIG. 13, in the eighth embodiment, the first processor 31 of the mobile terminal 200 executes the setting sending/changing application 27 stored in the first storage unit 26 to further function as a second setting information changing section 34.

The second setting information changing section 34 (the first processor 31) performs a setting information changing process. Specifically, the second setting information changing section 34 changes the setting information 29 stored in the first storage unit 26 to the setting information 29 changed by the first setting information changing section 81 (the second processor 54) according to an instruction from the setting information change instruction section 82 (the second processor 54). Therefore, according to the eighth embodiment, setting information (settings) of the mobile terminal 200 can be changed by the user operating the operation panel 42 of the image forming apparatus 400.

Embodiments of the present disclosure have been described above with reference to the drawings. Note that the present disclosure is not limited to the above embodiments, and may be applied to various alternative embodiments without departing the spirit and scope of the present disclosure.

For example, although the image forming apparatus is a multifunction peripheral in the above embodiments of the present disclosure, the present disclosure is not limited to a multifunction peripheral. The present disclosure is applicable to other image forming apparatuses such as a printer and a copier.

Note that the features of the present disclosure described in the above embodiments may be combined as appropriate. For example, in an embodiment of the present disclosure, the translation process described in the second embodiment, and the process of changing settings for the mobile terminal 200 described in the eighth embodiment, can both be carried out.

What is claimed is:

1. An image forming system comprising a mobile terminal and an image forming apparatus capable of wirelessly communicating with each other, wherein the mobile terminal includes:
a first storage that stores therein setting information of the mobile terminal,
a first display device configured to display a screen, and
a first processor configured to perform a process of transmitting the setting information stored in the first storage to the image forming apparatus, the image forming apparatus includes:
a second storage that stores therein at least one image and the setting information transmitted from the mobile terminal,
an operation panel through which an instruction is input, the instruction being an instruction to select a to-be-printed image from among the at least one image stored in the second storage,
a second processor configured to perform a character recognition process on the to-be-printed image selected according to the instruction input through the operation panel and an image process thereon based on the setting information stored in the second storage, and generate, in a situation in which the to-be-printed image includes a first character string image containing a character in a first language, a first character code string in the first language from the first character string image through execution of the character recognition process, and
a printing device configured to form the to-be-printed image processed by the image process on a recording medium, wherein the setting information includes languages setting information,
the screen that the first display device displays includes a character image in a second language set according to the language setting information,
the second processor
when the first character code string is generated, performs a translation process based on the language setting information stored in the second storage, the translation process being a process of converting the first character code string into a second character code string in the second language,
generates a second character string image corresponding to the second character code string, the second character string image containing a character image in the second language, and
performs, as the image process, a character image conversion process of replacing the first character string image in the to-be-printed image with the second character string image, and
the printing device forms the to-be-printed image processed by the character image conversion process on the recording medium, the to-be-printed image formed on the recording medium including the second character string image.

2. The image forming system according to claim 1, wherein
the setting information stored in the first storage further includes font setting information,
the font setting information indicates a font of a character to be displayed on the first display device,
the image process includes a process of adjusting print density, and
the second processor adjusts the print density according to the font that the font setting information stored in the second storage indicates.

3. The image forming system according to claim 2, wherein
the second processor increases the print density with an increase in character width of the font that the font setting information indicates.

4. The image forming system according to claim 1, wherein
the image process includes a process of adjusting a color, and
the second processor adjusts the color according to the second language that the language setting information stored in the second storage indicates.

5. The image forming system according to claim 1, wherein
the setting information stored in the first storage further includes character size setting information, the character size setting information indicating a size of a character to be displayed on the first display device,
the image process includes an enlargement/reduction process, and
the second processor determines an enlargement/reduction rate used in the enlargement/reduction process according to the character size that the character size setting information stored in the second storage indicates.

6. The image forming system according to claim 1, wherein
the operation panel has a second display device, and
the second processor performs a preview image display process of generating a preview image from the image stored in the second storage, and displaying the preview image on the second display device.

7. The image forming system according to claim 6, wherein
the setting information stored in the first storage further includes information about an enlargement/reduction rate of the screen to be displayed on the first display device, and
the second processor sets an enlargement/reduction rate of the preview image according to the information about the enlargement/reduction rate stored in the second storage based on the enlargement/reduction rate of the screen to be displayed on the first display device.

8. The image forming system according to claim 7, wherein
the information about the enlargement/reduction rate indicates an enlargement/reduction rate of a web browser displayed on the first display device.

9. The image forming system according to claim 6, wherein
the setting information stored in the first storage further includes font setting information the font setting information indicating a font of a character to be displayed on the first display device, and
the second processor performs
an operation screen display process of displaying an operation screen on the second display device, and
a font setting process of setting a font of a character to be displayed on the operation screen according to the font of the character that the font setting information stored in the second storage indicates.

10. The image forming system according to claim 6, wherein the setting information stored in the first storage further
includes backlight setting information, the backlight
setting information indicating setting for a backlight of
the first display device, and the second processor changes a setting for a backlight of
the second display device according to the backlight
setting information stored in the second storage based
on the setting for the backlight of the first display
device.

11. The image forming system according to claim 10,
wherein
the second processor initializes the setting for the backlight of the second display device when a predetermined period of time has passed since execution of a logout process.

12. The image forming system according to claim 10,
wherein
the backlight setting information stored in the first storage indicates a backlight lighting time when the backlight of the first display device continues to be on after a user's last operation on the mobile terminal, and
when the backlight lighting time that the backlight setting information stored in the second storage indicates has passed since a user's last operation on the image forming apparatus, the second processor turns off the backlight of the second display device.

13. The image forming system according to claim 10,
wherein
the backlight setting information stored in the first storage indicates a luminance of the backlight of the first display device, and
the second processor controls the backlight of the second display device to emit light at the same luminance as the luminance that the backlight setting information stored in the second storage indicates.

14. The image forming system according to claim 6,
wherein
the mobile terminal has a vibration function of presenting tactile vibration to a user,
the setting information stored in the first storage further includes vibration setting information, the vibration setting information indicating on/off of the vibration function of the mobile terminal,
the second display device is a tactile display configured to present tactile vibration to the user, and
the second processor switches on/off the presentation of the tactile vibration by the tactile display according to on/off of the vibration function of the mobile terminal that the vibration setting information stored in the second storage indicates.

15. The image forming system according to claim 6,
wherein
the mobile terminal further includes a first touch sensor,
the setting information stored in the first storage further includes touch sensor sensitivity information, the touch sensor sensitivity information indicating a sensitivity of the first touch sensor,
the operation panel has a second touch sensor, and
the second processor performs a sensitivity changing process of changing a sensitivity of the second touch sensor according to the sensitivity that the touch sensor sensitivity information stored in the second storage indicates.

16. The image forming system according to claim 6,
wherein
the setting information stored in the first storage further includes font setting information, the font setting information indicating a font of a character to be displayed on the first display device,
the image forming apparatus further includes a communication circuit that performs communication with an external device, and
the second processor performs
an operation screen display process of causing the second display device to display an operation screen,
a font data request process of requesting the font of the character that the font setting information stored in the second storage indicates from the external device through the communication circuit, and
a process of changing a font of a character displayed on the operation screen to the font received from the external device through the communication circuit.

17. The image forming system according to claim 1,
wherein
the mobile terminal outputs operation sound,
the setting information stored in the first storage further includes operation sound setting information, the operation sound setting information indicating on/off of outputting of the operation sound of the mobile terminal,
the operation panel outputs operation sound, and
the second processor switches on/off outputting of the operation sound of the operation panel according to on/off of outputting of the operation sound of the mobile terminal that the operation sound setting information stored in the second storage indicates.

18. The image forming system according to claim 1,
wherein
the second processor performs
a process of changing the setting information stored in the second storage and
a setting information change instruction process of instructing the mobile terminal to change the setting information stored in the first storage to the setting information changed by the second processor, and
the first processor changes the setting information stored in the first storage according to the instruction from the second processor.

19. The image forming system according to claim 1,
wherein
the first storage further stores first authentication information,
the first processor further performs a process of transmitting the first authentication information stored in the first storage to the image forming apparatus,
the second storage further stores therein second authentication information and the at least one image that is associated with the second authentication information, and
the second processor
determines whether or not the first authentication information transmitted from the mobile terminal matches the second authentication information stored in the second storage,
when it is determined that the first authentication information matches the second authentication information, requests, to the mobile terminal, transmission of the setting information stored in the first storage and causes the second storage to store the setting information received from the mobile terminal, and when it is determined that the first authentication information matches the second authentication information, allows input of an instruction to select a to-be-printed image from among the at least one image associated with the second authentication information through the operation panel.

20. An image forming system comprising a mobile terminal and an image forming apparatus capable of wirelessly communicating with each other, wherein the mobile terminal includes
- a first storage that stores therein setting information of the mobile terminal,
- a first display device configured to display a screen, and
- a first processor configured to perform a process of transmitting the setting information stored in the first storage to the image forming apparatus, the image forming apparatus includes
- a second storage that stores therein at least one image and the setting information transmitted from the mobile terminal,
- an operation panel through which an instruction is input, the instruction being an instruction to select a to-be-printed image from among the at least one image stored in the second storage,
- a second processor configured to perform a character recognition process on the to-be-printed image selected according to the instruction input through the operation panel and an image process thereon based on the setting information stored in the second storage, and generate, in a situation in which the to-be-printed image includes a first character string image containing a character in a first language, a first character code string in the first language from the first character string image through execution of the character recognition process,
- a printing device configured to form the to-be-printed image processed by the image process on a recording medium, and
- a communication circuit configured to communicate with an external translation device, the setting information includes language setting information, the screen that the first display device displays includes a character image in a second language set according to the language setting information, the second processor
- when the first character code string is generated, performs a translation request process of requesting the external translation device, through the communication circuit, to convert the first character code string into a second character code string in the second language according to the language setting information stored in the second storage,
- generates a second character string image corresponding to the second character code string received from the external translation device through the communication circuit, the second character string image containing a character image in the second language, and
- performs as the image process a character image conversion process of replacing the first character string image in the to-be-printed image with the second character string image, and the printing device forms the to-be-printed image processed by the character image conversion process on the recording medium, the to-be-printed image formed on the recording medium including the second character string image.

* * * * *